United States Patent
Shin et al.

(10) Patent No.: US 10,885,524 B2
(45) Date of Patent: Jan. 5, 2021

(54) METHOD AND APPARATUS FOR PURCHASING PRODUCT ONLINE

(71) Applicant: SAMSUNG ELECTRONICS CO., LTD., Suwon-si (KR)

(72) Inventors: Wonkwang Shin, Suwon (KR); Kyoung Gu Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 597 days.

(21) Appl. No.: 15/611,892

(22) Filed: Jun. 2, 2017

(65) Prior Publication Data

US 2018/0053186 A1     Feb. 22, 2018

(30) Foreign Application Priority Data

Aug. 17, 2016   (KR) .................. 10-2016-0104264

(51) Int. Cl.
   *G06Q 20/40*   (2012.01)
   *G06Q 20/32*   (2012.01)
   *G06Q 30/06*   (2012.01)

(52) U.S. Cl.
   CPC ....... *G06Q 20/4012* (2013.01); *G06Q 20/322* (2013.01); *G06Q 20/4014* (2013.01); *G06Q 20/40145* (2013.01); *G06Q 30/0601* (2013.01)

(58) Field of Classification Search
   CPC ............. G06Q 20/4012; G06Q 20/322; G06Q 20/4014; G06Q 20/40145; G06Q 30/0601
   USPC ........................................................ 705/72
   See application file for complete search history.

(56) References Cited

U.S. PATENT DOCUMENTS

| | | | |
|---|---|---|---|
| 2006/0235796 A1* | 10/2006 | Johnson | G06Q 20/32 705/44 |
| 2008/0082426 A1* | 4/2008 | Gokturk | G06Q 30/0623 705/26.62 |
| 2010/0319023 A1* | 12/2010 | Ko | H04N 7/17318 725/37 |
| 2012/0010995 A1* | 1/2012 | Skirpa | G06F 16/9577 705/14.49 |
| 2013/0021381 A1* | 1/2013 | Zhang | G06F 3/0481 345/661 |
| 2014/0195321 A1* | 7/2014 | Hubbard | G06Q 30/0225 705/14.26 |
| 2015/0054735 A1* | 2/2015 | Nakama | G06F 3/0304 345/156 |
| 2015/0364141 A1 | 12/2015 | Lee et al. | |
| 2016/0018966 A1* | 1/2016 | Gandhi | G06F 3/0484 715/856 |
| 2016/0259528 A1* | 9/2016 | Foss | G06F 3/04817 |

(Continued)

FOREIGN PATENT DOCUMENTS

| | | |
|---|---|---|
| JP | 2004-145667 A | 5/2004 |
| JP | 2013-511210 A | 3/2013 |

(Continued)

*Primary Examiner* — James D Nigh
(74) *Attorney, Agent, or Firm* — Cha & Reiter, LLC.

(57) ABSTRACT

A method and apparatus for purchasing a product online is provided. The method may include switching, in response to a user input, from a display mode that displays a screen to a purchasing mode, detecting a product, which is commercially available for purchase, from among elements shown on the screen in the purchasing mode, and distinguishing display of the detected product from other elements on the displayed screen.

20 Claims, 4 Drawing Sheets

(56) References Cited

U.S. PATENT DOCUMENTS

2017/0099340 A1\* 4/2017 Li .................. G06F 16/957
2017/0148082 A1\* 5/2017 Murahari .......... G06Q 30/0643
2017/0193582 A1\* 7/2017 Guo ................ G06Q 30/0631

FOREIGN PATENT DOCUMENTS

| JP | 2014-53025 A | 3/2014 |
|----|--------------|--------|
| KR | 2002-0006497 A | 1/2002 |
| KR | 10-2006-0081204 A | 7/2006 |
| KR | 10-2008-0002074 A | 1/2008 |
| KR | 10-2012-0128511 A | 11/2012 |
| KR | 10-2014-0108495 A | 9/2014 |
| KR | 10-2015-0125760 A | 11/2015 |

\* cited by examiner

METHOD AND APPARATUS FOR PURCHASING PRODUCT ONLINE

CROSS-REFERENCE TO RELATED APPLICATION(S)

This application claims the benefit under 35 U.S.C. § 119(a) of Korean Patent Application No. 10-2016-0104264 filed on Aug. 17, 2016, in the Korean Intellectual Property Office, the entire disclosure of which is incorporated herein by reference for all purposes.

BACKGROUND

1. Field

The following description relates to a method and apparatus for purchasing a product online.

2. Description of Related Art

When purchasing a product included in online content, searching and payment processes are executed. When the content is not provided for selling a product, information on the product is usually limited and a great amount of time is used to search for the product. Also, additional effort and time may be required to purchase the product, because a purchaser has to install an additional payment application or visit a webpage selling the product for a payment of the desired product. Thus, the purchaser occasionally gives up purchasing the product due to the process involved.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a method of purchasing a product online includes switching, in response to a user input, from a display mode that displays a screen to a purchasing mode, detecting a product, commercially available for purchase, from among element on the screen in the purchasing mode, and distinguishing a display of the detected product from other elements of the displayed screen.

The method of purchasing a product online may further include, in response to a user selecting the product, receiving authentication information to purchase the selected product, and determining whether a payment is to be approved based on the authentication information.

The detecting of the product may include detecting a product displayed within a specified distance from a touch input applied to the screen. The detecting of the product may include detecting the product available for purchase from either one or both of an image and a text included in the screen using a recognition model.

The user input may include any one or any combination of a voice input, a touch input, or an input by a button included in a terminal that displays the screen. The displaying may include arranging products detected from the screen based on preference information of the user and providing a list of the arranged products.

The method of purchasing a product online may further include, in response to the product being selected by a user, obtaining information associated with a purchase of the selected product from a server configured to provide the screen. The method of purchasing a product online may further include, in response to the product being selected by a user, producing information associated with a purchase of the selected product based on information displayed on the screen.

The method of purchasing a product online may further include recommending another product associated with a detected product in response to a determination that the detected product is currently unavailable for purchase.

The receiving of the authentication information may include receiving one or any combination of biometric recognition information of the user or electronic authentication information. The biometric recognition information may include any of or any combination of iris recognition information, fingerprint recognition information, vein recognition information, or voice recognition information, and the electronic authentication information may include any of or any combination of a personal identification number (PIN) of the user or certificate information.

Some or all elements displayed on the screen in the display mode may be maintained when the purchasing mode is executed or the user selects the product. The detected product may be distinguished from the other elements on the displayed screen by a shade, a color, a brightness, a chroma, or a marker and the distinguished product may be included in a list. The method may include switching the purchasing mode back to the display mode in response to no commercially available product being detected.

In one general aspect, an online product purchasing apparatus may include a processor and a memory configured to store instructions to be executed by the processor. Using the instructions being executed by the processor, the processor is configured to switch, in response to a user input, from a display mode that displays a screen to a purchasing mode, detect a product commercially available for purchase from the screen in the purchasing mode, and display the detected product.

The processor may be further configured to, in response to a user selecting the product, receive authentication information for purchasing the selected product, and determine whether a payment is to be approved based on the authentication information. The processor may be configured to detect a commercial product available for purchase displayed within a specified distance from a touch input applied to the screen. The processor may be further configured to, in response to the user selecting the product, obtain information associated with a purchase of the selected product from a server configured to provide the screen.

The processor may be further configured to, in response to the user selecting the product, obtain information associated with a purchase of the selected product based on information displayed on the screen. The processor may be further configured to recommend another product associated with the detected product in an event the detected product is currently unavailable for purchase. Some or all elements displayed on the screen in the display mode are maintained when the purchasing mode is executed or the user selects the product. The processor may be further configured to switch the purchasing mode back to the display mode in an event that no commercially available product is detected.

Other features and aspects will be apparent from the following detailed description, the drawings, and the claims.

Figure 1:
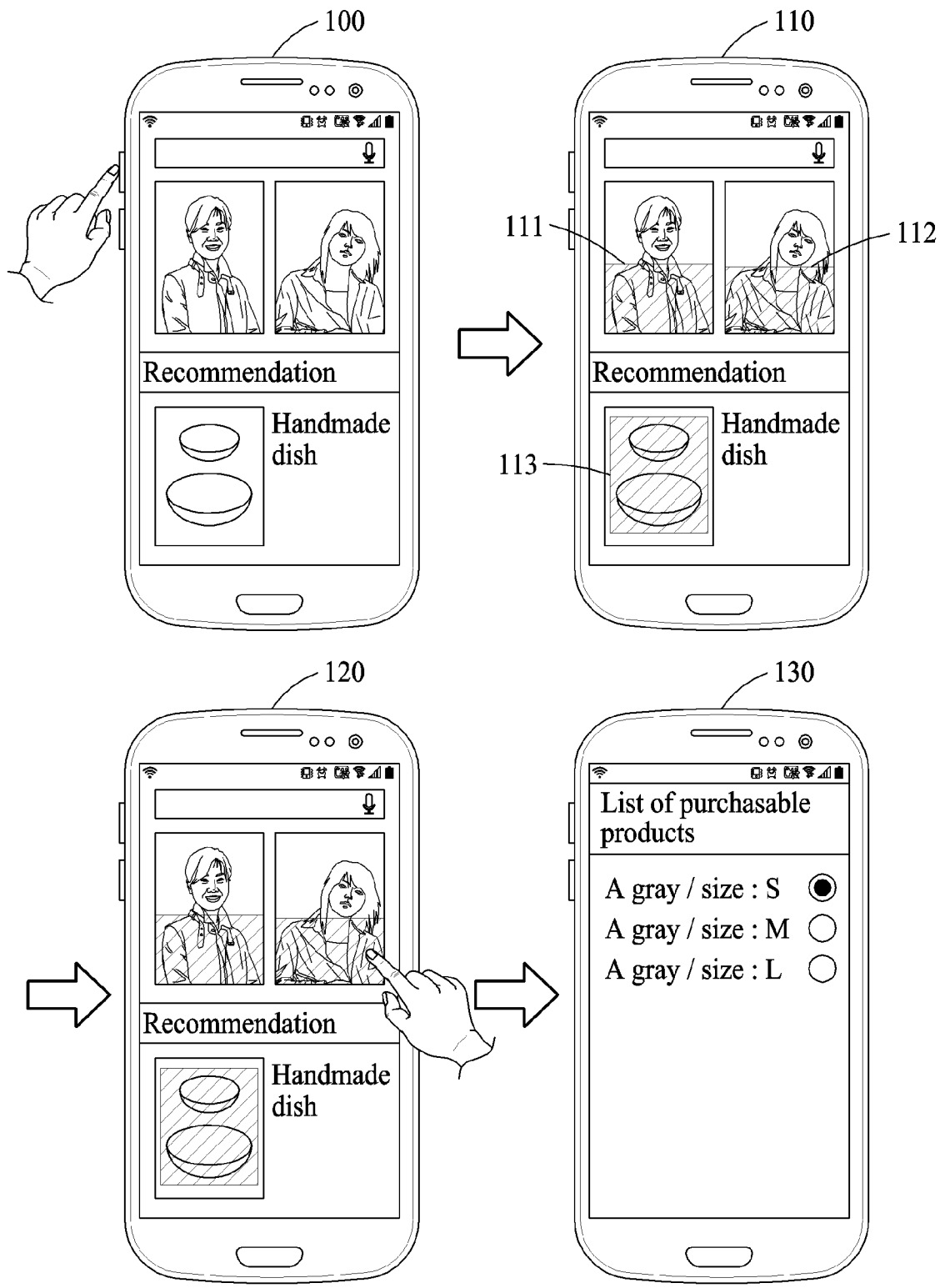
FIG. 1 is a diagram illustrating an example of switching from a display mode to a purchasing mode.

Throughout the drawings and the detailed description, unless otherwise described or provided, the same drawing reference numerals will be understood to refer to the same elements, features, and structures, where applicable. The drawings may not be to scale, and the relative size, proportions, and depiction of elements in the drawings may be exaggerated for clarity, illustration, or convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after having a full understanding of the present disclosure. The sequences of operations described herein are merely examples, and are not limited to those set forth herein, but may be changed as will be apparent, with the exception of operations necessarily occurring in a certain order, after a full understanding of the present disclosure. Also, descriptions of constructions that are known, after full understanding of the present disclosure, may be omitted for increased clarity and conciseness.

The features described herein may be embodied in different forms, and are not to be construed as being limited to the examples described herein. Rather, the examples described herein have been provided so that this disclosure will be thorough and complete, and will convey a scope of the disclosure after an understanding of the application.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one skilled in the art to which examples belong, after a full understanding of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When describing examples with reference to the accompanying drawings, like reference numerals refer to like or similar constituent elements and a repeated description related thereto will be omitted. When it is determined detailed description related to a related configuration may make the purpose of the examples unnecessarily ambiguous in describing the examples, the detailed description will be omitted here.

FIG. 1 is a diagram illustrating an example of switching from a display mode to a purchasing mode. An online product purchasing apparatus, in accordance with an embodiment, provides a user with a list of products available for purchase by automatically detecting the products from a currently displayed screen. The online product purchasing apparatus provides an instant payment process using a simple authentication method. In an example, the online product purchasing apparatus is included in an electronic apparatus, for example, a smartphone, a tablet computer, a personal computer (PC), or a wearable device, including an input device and a display device.

FIG. 1 illustrates an example of when a user browses a webpage using a smartphone including the online product purchasing apparatus. As illustrated in a screen 100, an image including various products are displayed on a webpage displayed on a display of the smartphone. The user presses a physical button provided on a side of the smartphone in order to purchase a product displayed on the webpage. In this example, the smartphone switches from a display mode to a purchasing mode.

Referring to FIG. 1, the display mode of the screen 100 is switched to the purchasing mode of a screen 110 through a predetermined mechanism of the user. The purchasing mode indicates a mode that provides information on an available product associated with the content displayed on the screen 100.

In response to the display mode being switched to the purchasing mode on the screen 110, the online product purchasing apparatus detects the product commercially available for purchase from among the display elements on the displayed webpage. The display elements on the displayed webpage may include images, text, animations, frames, banners, embedded video, embedded audio, advertisements, or other file types typically associated with webpages. The online product purchasing apparatus distinguishes and displays the product detected from the webpage as shown in images 111, 112 and 113 on the screen 110.

As shown on a screen 120, the user selects the product displayed in a shade. In response to the product being selected by the user, the online product purchasing apparatus displays product information associated with the selected product on a screen 130.

Subsequently, the online product purchasing apparatus performs a user authentication process when the user determines whether to purchase the selected product. In an example, the online product purchasing apparatus may use biometric recognition information including iris recognition information, fingerprint recognition information, vein recognition information, and/or voice recognition information. In another example, the online product purchasing apparatus may use electronic authentication information including a personal identification number (PIN) of the user and/or certificate information.

The online product purchasing apparatus reduces time and effort of executing a program to obtain product information to purchase the product displayed on a screen while using a specified program, for example, a web browser. Because execution of a payment program is unnecessary, the online product purchasing apparatus reduces time and effort even when the product information is obtained. Thus, the online product purchasing apparatus may be used to purchase the product in a simple manner without stopping the executing program.

In an example, a program that displays a screen from which the product is detected by the online product purchasing apparatus includes a web browser or an application.

The screen from which the product is detected is a display screen of an application or a web page that are unrelated to shopping, or a display screen of an application or a webpage that are related to shopping. A method of obtaining information on a purchase of the product may vary based on whether the web page and the application are related to shopping.

Figure 2:
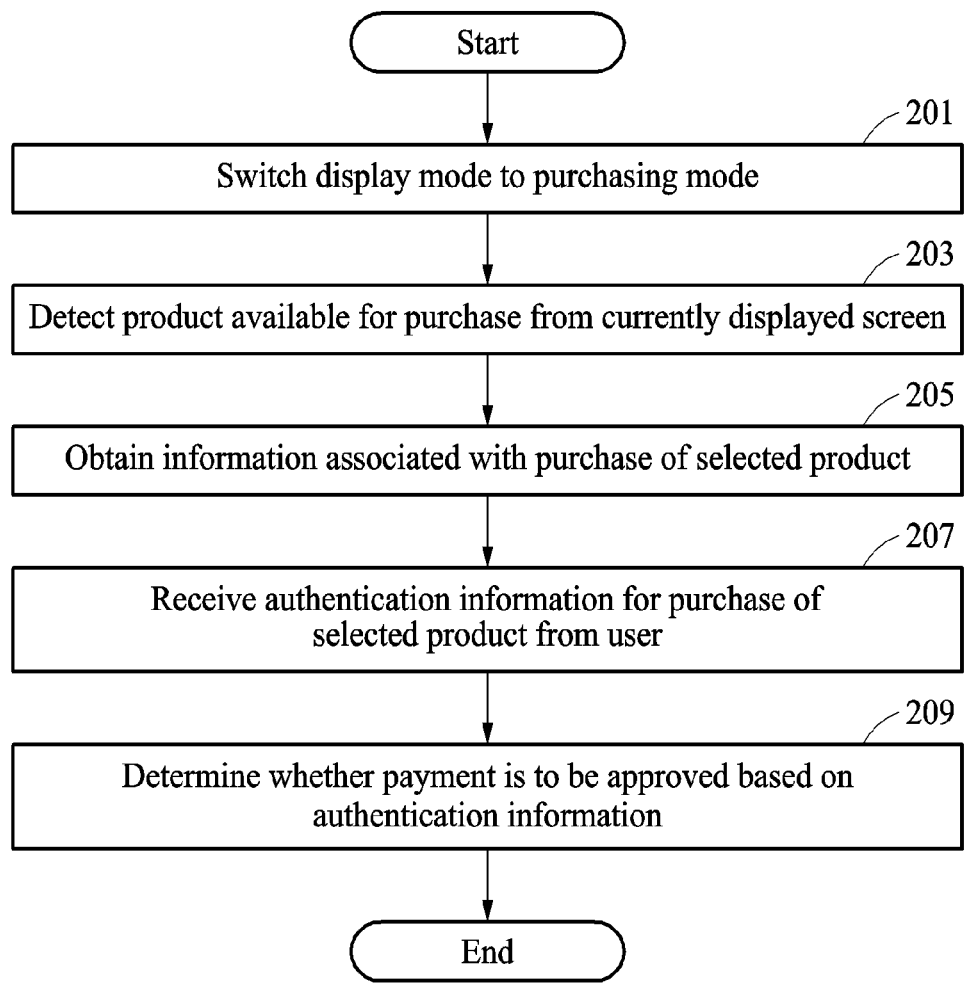
FIG. 2 is a flowchart illustrating an example of purchasing a product online.

FIG. 2 is a flowchart illustrating an example of purchasing a product online. In operation 201, an online product purchasing apparatus switches from a display mode that displays a screen to a purchasing mode in response to a user input corresponding to the purchasing mode. For example, the user generates the user input corresponding to the purchasing mode by pressing a physical button included in a screen display apparatus. The user may switch the display mode of the online product purchasing apparatus to the purchasing mode using a screen touch method or a voice recognition method. A touch method may include various examples based on an amount of time used for touching and a number of touches. The user may execute the purchasing mode based on a voice input, a touch input, and/or an input by a button included in a terminal that displays the screen.

Operation 203 may be performed in the purchasing mode. The online product purchasing apparatus detects a product commercially available for purchase from among display elements on a currently displayed screen in the purchasing mode. In an example, the online product purchasing apparatus detects the product available for purchase from either one or both of an image and a text included in the screen using a recognition model. A level of confidence of the product recognized using the recognition model may vary for each product. The online product purchasing apparatus detects a product of which the level of confidence is greater than or equal to a threshold value.

The detected product is recognized and distinguished within the display on the screen or provided as a list so that the user selects the detected product. For example, the detected product is distinguished from other elements on the screen by a shade, a color, a brightness, a chroma, or a marker.

In another example, the online product purchasing apparatus detects the product available for purchase displayed within a specified distance from the touch input applied to the screen. The online product purchasing apparatus detects all products commercially available for purchase displayed on the screen and provides product information.

In an example, the online product purchasing apparatus arranges the products commercially available for purchase detected from the screen based on preference information, and provides a list of the arranged products. For example, the online product purchasing apparatus arranges the products commercially available for purchase in an order of priority of preference information stored in a memory, and displays the list of the arranged products on a display. In another example, the online product purchasing apparatus displays a product displayed on a nearest portion to the touch input by allocating the product on a top of the list.

In operation 205, the online product purchasing apparatus produces product information associated with the detected product. For example, the product information including a size or a price of the detected product is provided as a list. For example, the online product purchasing apparatus produces the product information associated with the product detected from a webpage, such as a webpage added to a favorite list, unrelated to a currently displayed screen. Subsequently, the user selects the product to be purchased from the list. The information for purchase of the product includes information for a payment and product information for selecting the product. The information for the payment includes address information, card information, personal information, or loyalty/reward point information, and the product information may include a size, a name of a model, a price, or an address of a website selling the product.

In an example, in response to the user selecting the product, the online product purchasing apparatus obtains information associated with a purchase of the selected product from a server configured to provide the screen. For example, when the user searches an online shopping mall for the product, a website of the shopping mall is displayed on the screen, and the online product purchasing apparatus may receive purchase information or the product information on the selected product from the server. Thus, the online product purchasing apparatus may obtain the information associated with the purchase of the product from a source external to the displayed page.

In another example, in response to the user selecting the product, the online product purchasing apparatus produces the information associated with the purchase of the selected product based on the information displayed on the screen. For example, the screen displays an image of the product in addition to an image or a text related to the product information, for example, the price or the size of the product. For example, a comment on the website includes the product information. The online product purchasing apparatus produces the information associated with the purchase of the product by automatically recognizing materials associated with the product information.

The recognition model is used to automatically recognize the materials associated with the product information. A level of confidence of the materials recognized using the recognition model may vary. In an example, the online product purchasing apparatus obtains the information associated with the purchase of the product using the materials of which the level of confidence is greater than or equal to a threshold value.

For example, when an article that introduces a new novel by a writer A on May 19, 2016 is displayed on the screen, the online product purchasing apparatus may obtain the product information on a book based on a name of the writer or a date indicated in the article. Thus, the online product purchasing apparatus produces the information associated with the purchase of the product from a source internal to the displayed page.

In operation 207, in response to the user selecting the product, the online product purchasing apparatus receives authentication information for the purchase of the selected product from the user. In operation 209, the online product purchasing apparatus determines whether a payment is to be approved based on the authentication information. The authentication information may be biometric recognition information of the user or electronic authentication information. The biometric recognition information may include, for example, fingerprint recognition information, iris recognition information, voice recognition information, or vein recognition information of a hand, associated with physical attributes of a user. The electronic authentication information may include a personal identification number (PIN) of the user or information electronically containing personal information of the user, for example, a certificate.

A program that provides the screen is maintained even when the purchasing mode is executed or the user selects the product. Thus, the online product purchasing apparatus proceeds with the payment based on the authentication information and purchases the product without stopping the executing program.

Figure 3:
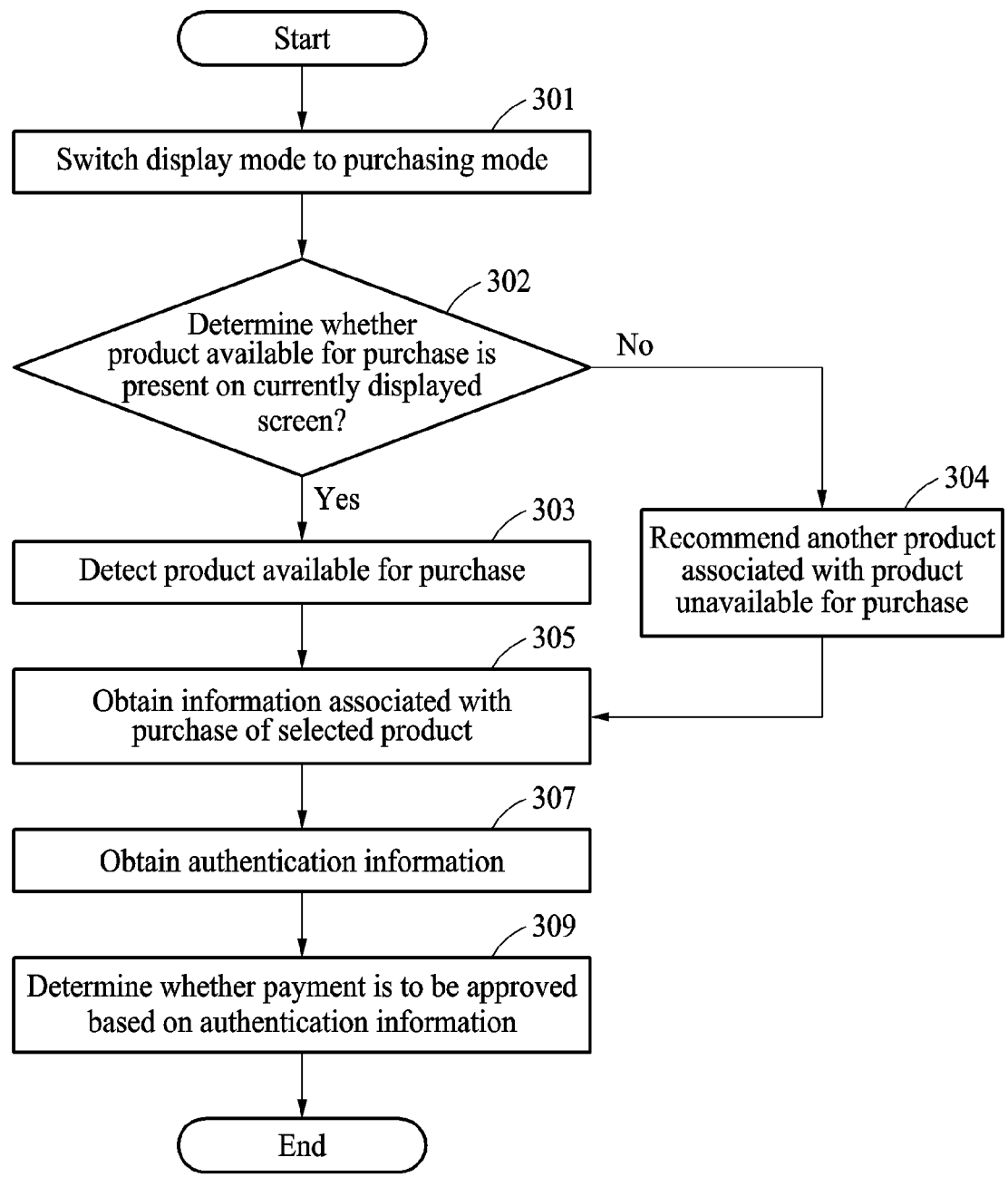
FIG. 3 is a flowchart illustrating another example of purchasing a product online.

FIG. 3 is a flowchart illustrating another example of purchasing a product online. In operation 301, an online product purchasing apparatus switches a display mode to a purchasing mode in response to a user input. In operation 302, the online product purchasing apparatus determines whether a commercially available product is present on a currently displayed screen. In operation 303, in response to the commercially available product being present, the online product purchasing apparatus detects the actual availability of the product for purchase.

In response to a commercially available product being absent from the screen, the online product purchasing apparatus distinguishes a case in which any commercial product is absent altogether from a case in which a commercial product is unavailable because the product is sold out. In response to the absence of any commercially available product, the online product purchasing apparatus displays information indicating that a product is absent and then terminates the purchasing mode. In operation 304, the online product purchasing apparatus recommends to the user another product associated with the currently unavailable product. The currently unavailable product may include a product unavailable because the product is sold out.

The online product purchasing apparatus determines a product associated with the currently unavailable product based on preference information of the user. For example, the online product purchasing apparatus produces the preference information of the user based on a record of purchases by the user, and recommends a product having a relatively high priority by assigning a priority order to related products based on the preference information. The preference information may be referred to as information indicating a user preference for the product.

In operation 305, the online product purchasing apparatus internally produces or externally obtains information associated with a purchase of the product selected by the user. In operation 307, the online product purchasing apparatus obtains authentication information from the user. In operation 309, the online product purchasing apparatus determines whether a payment is to be approved based on the authentication information. The online product purchasing apparatus completes the payment when the user is authorized based on the authentication information.

Figure 4:
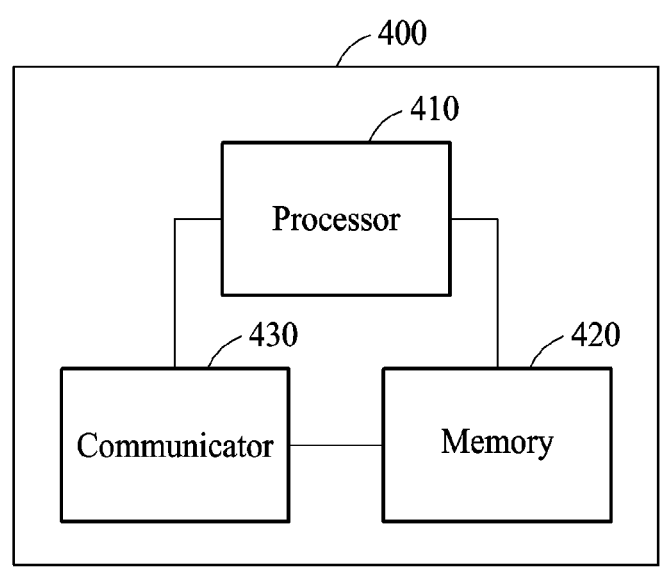
FIG. 4 is a block diagram illustrating an example of an online product purchasing apparatus.

FIG. 4 is a block diagram illustrating an example of an online product purchasing apparatus. An online product purchasing apparatus 400 includes a processor 410, a memory 420 configured to store instructions to be executed by the processor 410, and a communicator 430.

The communicator 430 performs exchanging of information for online access by a web browser or an application. The communicator 430 receives information associated with a purchase of a product from an outside source.

The memory 420 stores the instructions to be executed by the processor 410. The memory 420 stores preference information of a user as a reference for arranging products available for purchase in an order of priority. The memory 420 stores authentication information of the user or the information associated with the purchase of the product. The memory 420 stores the information associated with the purchase of the product received from an outside source.

The processor 410 performs an operation for purchasing the product online using the instructions stored in the memory 420. The processor 410 switches from a display mode that displays a screen to a purchasing mode in response to a user input corresponding to selection of the purchasing mode. In the purchasing mode, the processor 410 detects the product commercially available for purchase from among elements on a currently displayed screen.

The processor 410 detects the product commercially available for purchase displayed within a preset distance from a touch input applied to the screen. The processor 410 displays the detected product by distinguishing the detected product from other elements on the displayed screen, and provides a list including the detected product. In response to a product currently unavailable for purchase being detected on the screen, the processor 410 recommends for purchase another product associated with the currently unavailable product. In response to a commercially available product being absent from the screen altogether, the processor 410 may display information indicating that a product is absent and then terminate the purchasing mode.

In an example, in response to the user selecting the product, the communicator 430 obtains information associated with the purchase of the selected product from a server configured to provide the screen. In another example, in response to the user selecting the product, the processor 410 obtains the information associated with the purchase of the selected product based on the information displayed on the screen.

In response to the user selecting the product, the processor 410 receives authentication information for the purchase of the selected product from the user. Subsequently, the processor 410 determines whether a payment is to be approved based on the authentication information.

The online product purchasing apparatus 400 maintains some or all elements of the screen in the display mode when the purchasing mode is executed or the user selects the product. Thus, the online product purchasing apparatus 400 may enable an instant purchase without an additional product searching process or an additional payment process for the purchase.

Examples of illustrated hardware components include controllers, sensors, generators, drivers, and any other electronic components known to one skilled in the art after full understanding of the present disclosure. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known, after full understanding of the present disclosure, that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one skilled in the art, after full understanding of the present disclosure, that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of purchasing a product online, comprising:
   switching, in response to a user input, from a display mode to a purchasing mode,
   in response to switching to the purchasing mode, automatically detecting a purchasable product;
   distinguishing a display of the detected purchasable product from other elements on a screen;
   receiving a selection of the distinguished purchasable product; and
   providing information associated with a purchase regarding the distinguished purchasable product,
   wherein the detecting of the product comprises detecting a product displayed within a specified distance from a touch input applied to the screen,
   wherein providing the information associated with a purchase regarding the distinguished purchasable product comprises:
   automatically recognizing materials associated with the information associated with a purchase by using a recognition model;
   determining a confidence of the recognized materials;
   obtaining the information associated with a purchase by using the materials of which the confidence is greater than or equal to a threshold value; and
   providing the information associated with a purchase.

2. The method of claim 1, further comprising:
   receiving authentication information to purchase the detected product in response to a user selecting the detected product; and
   determining, based on the authentication information, whether a payment is to be approved.

3. The method of claim 1, wherein the detecting of the product comprises using a recognition model to detect the product from either one or both of an image and a text included in the screen.

4. The method of claim 1, wherein the user input comprises any one or any combination of a voice input, a touch input, or an input by a button included in a terminal that displays the screen.

5. The method of claim 1, wherein the distinguishing comprises:
   arranging products detected from the screen based on preference information of the user; and
   providing a list of the arranged products.

6. The method of claim 1, further comprising:
   obtaining, in response to the detected product being selected by a user, the information associated with a purchase of the selected product from a server configured to provide the screen.

7. The method of claim 1, further comprising:
   producing, in response to the product being selected by a user, the information associated with a purchase of the selected product based on information displayed on the screen.

8. The method of claim 1, further comprising:
   recommending, to the user, another product associated with the detected product in response to a determination that the detected product is currently unavailable for purchase.

9. The method of claim 2, wherein the receiving of the authentication information comprises receiving one or any combination of biometric recognition information of the user or electronic authentication information.

10. The method of claim 9, wherein
the biometric recognition information comprises any of or any combination of iris recognition information, fingerprint recognition information, vein recognition information, or voice recognition information, and
the electronic authentication information comprises any of or any combination of a personal identification number (PIN) of the user or certificate information.

11. The method of claim 2, wherein some or all elements on the screen in the display mode are maintained in response to the purchasing mode being executed or the user selecting the product.

12. The method of claim 1, wherein the detected product is
distinguished from the other elements on the displayed screen by a shade, a color, a brightness, a chroma, or a marker; and
the distinguished product is included in a list.

13. The method of claim 1, wherein the purchasing mode is switched back to the display mode in response to no commercially available product being detected.

14. An online product purchasing apparatus comprising:
a processor; and
memory configured to store instructions to be executed by the processor,
wherein, using the instructions being executed by the processor, the processor is configured to:
switch, in response to a user input, from a display mode to a purchasing mode;
in response to switching to the purchasing mode, automatically detect a purchasable product detecting a product displayed within a specified distance from a touch input applied to a screen;
distinguish a display of the detected product from other elements on a displayed screen;
receive a selection of the distinguished purchasable product; and
provide information associated with a purchase regarding the distinguished purchasable product by automatically recognizing materials associated with the information associated with a purchase by using a recognition model; determining a confidence of the recognized materials; obtaining the information associated with a purchase by using the materials of which the confidence is greater than or equal to a threshold value; and providing the information associated with a purchase.

15. The online product purchasing apparatus of claim 14, wherein the processor is further configured to:
receive authentication information to purchase the detected product in response to a user selecting the product, and
determine, based on the authentication information, whether a payment is to be approved.

16. The apparatus of claim 15, wherein the processor is further configured to, obtain the information associated with a purchase of the detected product from a server configured to provide the screen in response to the user selecting the product.

17. The apparatus of claim 15, wherein the processor is further configured to produce, in response to the user selecting the product, the information associated with a purchase of the selected product based on information displayed on the screen.

18. The apparatus of claim 15, wherein the processor is further configured to recommend, to the user, another product associated with the detected product in response to a determination that the detected product is currently unavailable for purchase.

19. The apparatus of claim 15, wherein some or all elements displayed on the screen in the display mode are maintained in response to the purchasing mode being executed or the user selecting the product.

20. The apparatus of claim 14, wherein the processor is further configured to switch the purchasing mode back to the display mode in response to no commercially available product being detected.

* * * * *